(12) United States Patent
Becker

(10) Patent No.: US 12,487,118 B2
(45) Date of Patent: Dec. 2, 2025

(54) VTILE DEVICE AND METHODS OF USING THE SAME

(71) Applicant: SCENTBRIDGE HOLDINGS, LLC, Ridgefield, CT (US)

(72) Inventor: Todd H. Becker, Ridgefield, CT (US)

(73) Assignee: SCENTBRIDGE HOLDINGS, LLC, Ridgefield, CT (US)

( * ) Notice: Subject to any disclaimer, the term of this patent is extended or adjusted under 35 U.S.C. 154(b) by 479 days.

(21) Appl. No.: 18/047,325

(22) Filed: Oct. 18, 2022

(65) Prior Publication Data
US 2023/0143606 A1    May 11, 2023

Related U.S. Application Data

(60) Provisional application No. 63/276,149, filed on Nov. 5, 2021.

(51) Int. Cl.
| | | |
|---|---|---|
| *G01H 17/00* | (2006.01) | |
| *G01H 11/06* | (2006.01) | |
| *G08C 17/02* | (2006.01) | |
| *G16H 20/30* | (2018.01) | |
| *G16H 15/00* | (2018.01) | |
| *G16H 40/63* | (2018.01) | |
| *G16H 40/67* | (2018.01) | |

(52) U.S. Cl.
CPC ............. *G01H 17/00* (2013.01); *G08C 17/02* (2013.01); *G16H 20/30* (2018.01)

(58) Field of Classification Search
CPC ........ G01H 17/00; G01H 11/06; G08C 17/02; G16H 20/30; G16H 15/00; G16H 40/63; G16H 40/67
See application file for complete search history.

(56) References Cited

U.S. PATENT DOCUMENTS

| | | | | |
|---|---|---|---|---|
| 2018/0169475 A1* | 6/2018 | Nam | ................... | A63B 24/0006 |
| 2018/0292471 A1* | 10/2018 | Chen | ..................... | B60W 40/12 |

FOREIGN PATENT DOCUMENTS

| | | | | |
|---|---|---|---|---|
| WO | WO-2018074721 A1 * | 4/2018 | ............. | G01H 17/00 |
| WO | WO-2018142107 A1 * | 8/2018 | ............... | G01H 1/00 |

\* cited by examiner

*Primary Examiner* — Daniel S Larkin
*Assistant Examiner* — Anthony W Megna Fuentes
(74) *Attorney, Agent, or Firm* — Lando & Anastasi, LLP

(57) ABSTRACT

Vibration tiles, vibration tile systems, and methods of operating the same include vibration sensors that acquire vibration data from a surface coupled to the vibration tile. The tile includes a housing, a power unit supported by the housing, the power unit configured to supply power to the vibration tile device, a vibration sensor supported by the housing, the vibration sensor configured to acquire vibration data from a surface, a wireless communication configured to wirelessly transmit the vibration data to at least one gateway device, and a controller coupled to the power unit, the vibration sensor, and the wireless communication module, the controller configured to operate the vibration sensor to acquire the vibration data from the surface. The vibration tiles may be used to train a profile to define and recognize known events corresponding to the vibration data acquired by one or more of the tiles.

19 Claims, 14 Drawing Sheets

VTILE DEVICE AND METHODS OF USING THE SAME

CROSS REFERENCE TO RELATED APPLICATIONS

This application claims priority under 35 U.S.C. § 119(e) to U.S. Provisional Application No. 63/276,149, titled VTILE DEVICE AND METHODS OF USING THE SAME, filed Nov. 5, 2021, which is incorporated by reference in its entirety for all purposes.

BACKGROUND OF DISCLOSURE

1. Field of Disclosure

The present disclosure generally relates to systems and methods utilizing devices with wireless vibration sensors.

2. Discussion of Related Art

With the maturation of the Internet, including the advent of smartphones, the cloud, and the Internet-of-Things (IoT), traditional devices like televisions and appliances became more and more continuously connected to the Internet and other devices. As a result, people often expect every machine and device they encounter to either be connected to the Internet or at least be readily able to communicate with their smartphone. However, machines and devices are often not capable of being connected to the Internet or able to communicate with a user's smartphone.

Some people may prefer to simply replace an old appliance or machine with a newer one. For example, if a traditional non-electronic trashcan needed to be replaced or if a person simply wanted the ability to know, via their smartphone or other Internet enabled device, whether the trash is full, they would need to buy a new trashcan that could connect to the Internet. However, this approach may not be desired or optimal for a variety of reasons including cost and waste.

Adding customized sensors and/or wireless connectivity to gain useful information from an appliance, device, or other object is costly, time-consuming, and beyond the reach of the typical layperson or small organization. Even for larger entities, like a business owner or a corporate manager, upgrading legacy equipment that is not compatible with wireless connectivity or mobile devices is exceptionally cost prohibitive at a large scale.

Thus, there is a need to provide a device capable of sensing real-time physical characteristics of an object and transmitting that information to a remote device connected to the Internet for processing and analysis, thereby providing a user with customizable, useful and detailed information about the object wherever the user may be located.

SUMMARY OF DISCLOSURE

According to at least one embodiment there is provided a vibration tile device comprising a housing, a power unit supported by the housing, the power unit being configured to supply power to the vibration tile device, a vibration sensor supported by the housing, the vibration sensor being configured to acquire vibration data from a surface, a wireless communication module supported by the housing, the wireless communication module being configured to wirelessly transmit the vibration data to at least one gateway device, and a controller coupled to the power unit, the vibration sensor, and the wireless communication module, the controller being supported by the housing and configured to operate the vibration sensor to acquire the vibration data from the surface.

In one example, the wireless communication module utilizes a communication protocol that is one of Bluetooth, NFC, Wi-Fi, Z-Wave, or cellular.

In another example, the housing includes a surface including a machine-readable identifier configured to be scanned by a user to direct the user to a mobile application or website that utilizes the acquired vibration data.

In one example, the surface includes the machine-readable identifier is on a side of the vibration tile device opposite to the surface attached to the vibration tile device, and wherein the machine-readable identifier is one of a bar code, a QR code, and an NFC tag that uniquely identifies the vibration tile device.

In another example, the housing includes a surface including one of an adhesive or a magnet configured to adhere the vibration tile device to the surface to acquire the vibration data.

In one example, the power unit is configured to receive power from one of a rechargeable lithium ion battery and an alkaline battery.

In another example, the vibration sensor includes an accelerometer.

In one example, the vibration sensor further is configured to acquire the vibration data in three different axes.

In another example, the controller further is configured to wirelessly transmit the vibration data to at least one gateway device without storing the vibration data within the vibration tile device.

According to at least one embodiment there is provided a vibration tile system comprising at least one vibration tile device comprising a vibration sensor configured to acquire vibration data from a surface, a controller configured to operate the vibration sensor to acquire the vibration data from the surface, and a wireless communication module configured to wirelessly transmit the vibration data. The system comprises at least one gateway device configured to receive the wirelessly transmitted vibration data from the at least one vibration tile device and at least one processor configured to receive the vibration data from the at least one gateway device and process the vibration data.

In one example, the at least one gateway device is one of a smartphone, a tablet, a smart watch, a laptop, a desktop, and a router.

In another example, the at least one processor further is configured to classify the vibration data by extracting one or more vibration signatures from the vibration data and classifying each of the one or more vibration signatures as one of a plurality of events.

In one example, the at least one gateway device is configured to transmit the vibration data to a cloud environment.

In another example, the at least one processor is located in the cloud environment.

In one example, the at least one processor is located in the at least one gateway device.

In another example, the at least one processor is located in the at least one vibration tile device.

In one example, the at least one vibration tile device further is configured to transmit the vibration data to the cloud environment responsive to a power level of the at least one vibration tile device being higher than a threshold. In one example, the threshold corresponds to a minimum battery level.

In another example, the at least one processor further is configured to train a profile of the at least one vibration tile device to interpret the vibration data acquired from the surface as corresponding to one or more of a plurality of events.

In one example, the at least one processor further is configured to use a pre-existing profile of one or more of a plurality of events to interpret the vibration data acquired from the surface as corresponding to the one or more of the plurality of events.

According to at least one embodiment there is provided a method of acquiring and processing vibration data from at least one vibration tile device, the at least one vibration tile device comprising a vibration sensor configured to acquire vibration data from a surface, a controller configured to operate the vibration sensor to acquire the vibration data from the surface, and a wireless communication module configured to wirelessly transmit the vibration data, the method comprising the acts: positioning the at least one vibration tile against the surface, acquiring the vibration data from the surface, wirelessly transmitting the vibration data to at least one gateway device, and processing the vibration data with at least one processor.

In one example, processing the vibration data further comprises the at least one processor extracting one or more vibration signatures from the vibration data and classifying each of the one or more vibration signatures as one of a plurality of events.

In another example, the method further comprises transmitting the vibration data to a cloud environment.

In one example, the at least one processor trains a profile of the at least one vibration tile device to interpret the vibration data acquired from the surface as corresponding to one or more of a plurality of events.

In another example, the at least one processor uses a pre-existing profile of the at least one vibration tile device to interpret the vibration data acquired from the surface as corresponding to one or more of a plurality of events.

According to at least one embodiment there is provided a vibration tile system comprising at least one vibration tile device comprising a vibration sensor configured to acquire vibration data from a surface of a piece of exercise equipment, a controller configured to operate the vibration sensor to acquire the vibration data from the surface, and a wireless communication module configured to wirelessly transmit the vibration data, at least one gateway device configured to receive the wirelessly transmitted vibration data from the at least one vibration tile device, and at least one processor configured to receive the vibration data from the at least one gateway device and recognize the vibration data as one of a plurality of predefined workout activities of a user engaging with the piece of exercise equipment.

In one example, the plurality of predefined workout activities includes one or more of lifting a weight from a weight rack, returning a weight to a weight rack, riding a stationary bicycle, running on a treadmill, and sitting in a seat of the piece of exercise equipment.

In another example, the plurality of predefined workout activities includes one or more of sitting on a stationary bicycle, attaching the user's shoes to pedals of the bicycle, rotation of the pedals, lack of rotation of the pedals, and the user getting off the bicycle.

In one example, the plurality of predefined workout activities includes one or more of a duration of the user engaging with the piece of exercise equipment and a number of repetitions of the user engaging with the piece of exercise equipment.

In another example, the at least one processor further is configured to extract one or more vibration signatures from the vibration data and classify each of the one or more vibration signatures as one of the plurality of predefined workout activities.

In one example, the at least one gateway device is configured to transmit the vibration data to a cloud environment, wherein the vibration data is stored in the cloud environment and associated with an account of the user.

In another example, the account of the user is configured to be accessible by the user, the account containing workout data including the processed vibration data.

In one example, the at least one vibration tile device includes a surface including a machine-readable identifier configured to be scanned by the user to direct the user to a mobile application or website that utilizes the acquired vibration data.

In another example, responsive to the user scanning the machine-readable identifier, the at least one processor further is configured to associate the user with the vibration data acquired from the surface of the piece of exercise equipment.

In one example, the at least one processor further is configured to train a profile of the at least one vibration tile device to recognize the plurality of predefined workout activities from the at least one piece of exercise equipment.

In another example, the at least one processor further is configured to use a pre-existing profile of the at least one piece of exercise equipment for the at least one vibration tile device, wherein the pre-existing profile associates one or more of the plurality of predefined workout activities with corresponding vibration signatures.

In one example, the at least one processor further is configured to extract a dominant frequency from the vibration data and classify the vibration data based on the dominant frequency.

According to at least one embodiment there is provided a dumpster monitoring system comprising at least one vibration tile device comprising a vibration sensor configured to acquire vibration data from a surface of a dumpster, a controller configured to operate the vibration sensor to acquire the vibration data from the surface, and a wireless communication module configured to wirelessly transmit the vibration data, at least one gateway device configured to receive the wirelessly transmitted vibration data from the at least one vibration tile device, and at least one processor configured to receive the vibration data from the at least one gateway device, recognize the vibration data as one of a plurality of predefined dumpster activities, and periodically provide a report representative of each recognized dumpster activity to a user, the report including at least one of a frequency of the dumpster being emptied over a period of time.

In one example, the plurality of predefined dumpster activities includes one or more of closing a lid of the dumpster, opening a lid of the dumpster, depositing one or more objects into the dumpster, and the dumpster being emptied.

In another example, the at least one processor further is configured to extract one or more vibration signatures from the vibration data and classify each of the one or more vibration signatures as one of the plurality of predefined dumpster activities.

In one example, the at least one gateway device is configured to transmit the vibration data to a cloud environment, wherein the vibration data is stored in the cloud environment and associated with an account of the user.

In another example, the at least one processor further is configured to train a profile of the at least one vibration tile device to recognize the one of the plurality of predefined dumpster activities from the dumpster.

In one example, the at least one vibration tile device includes a surface including a machine-readable identifier configured to be scanned by the user to direct the user to a mobile application or website that utilizes the acquired vibration data.

BRIEF DESCRIPTION OF DRAWINGS

Various aspects of at least one embodiment are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of embodiments of the disclosure. In the figures:

DETAILED DESCRIPTION

Figure 1A:
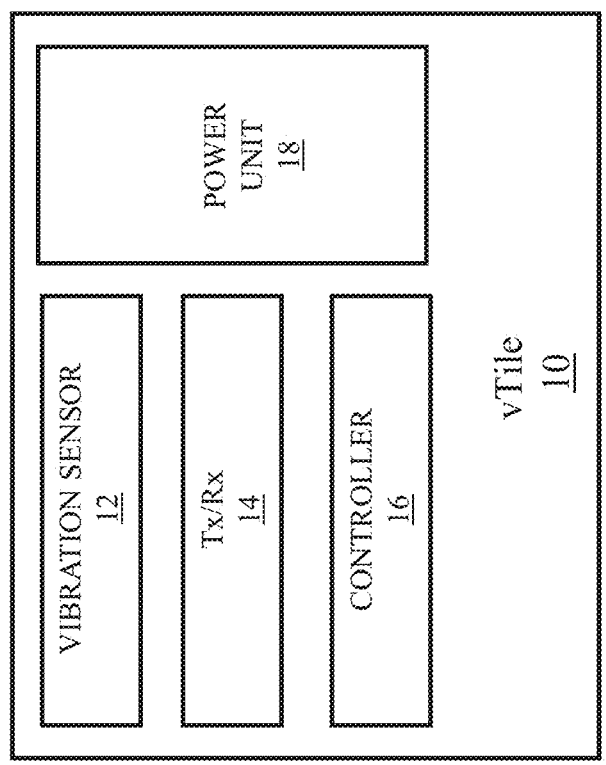
FIG. 1A is a block diagram of a vibration tile device according to at least one embodiment.

It is to be appreciated that embodiments of the systems and methods discussed herein are not limited in application to the details of construction and the arrangement of components set forth in the following description or illustrated in the accompanying drawings. The methods, devices, and systems are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Due to the ever-expanding utility and ubiquity of mobile devices like smartphones, users expect their devices to obtain and record ever more information from their environment and things with which they interact on a regular basis. For example, today's consumers are no longer interested in just setting a simple timer to brew coffee in the morning. Today's consumers have on-the-go demands and require the ability to set that timer remotely from half-way around the world, be notified when brewing has commenced, and be provided with a report of how much their coffee intake has increased since last month, for example. Not all devices have the capability to provide such data to users. Many existing devices are not configured to interface with a person's smartphone or device. Embodiments described herein provide a solution using wirelessly enabled vibration tile devices that can be attached to surfaces of many different types of objects to provide an ability to remotely receive data pertaining to usage of the object or to supplement information obtained from an existing device already connected to the Internet or a local network.

In the coffee maker example above, a standard coffee maker does not connect to the internet or other devices, such as a smartphone. The coffee maker has one task: to make coffee. One could go out and buy a coffee maker that may have the ability to connect to the Internet or smartphone, but embodiments herein provide a different option.

FIG. 1A is a block diagram of a vibration tile device 10 that includes a vibration sensor 12, a wireless transmission module 14, a controller 16, and a power unit 18. The vibration tile device, sometimes referred to herein as a "vTile," is a self-contained unit configured to be adhered to almost any surface for the purposes of acquiring vibrational data from the surface and wirelessly transmitting data to a gateway device 24 (not shown in FIG. 1A, but discussed in more detail below).

Figure 1B:
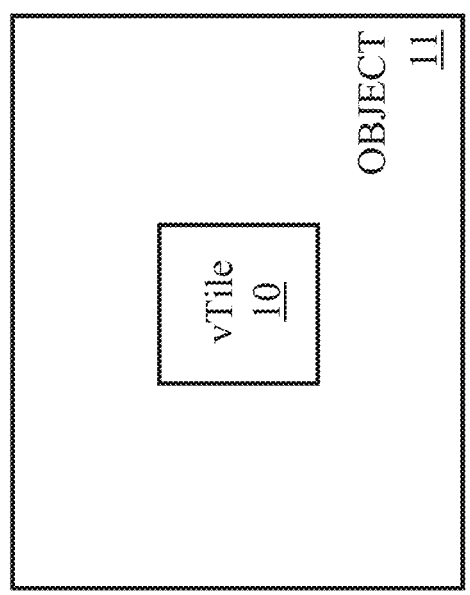
FIG. 1B is a block diagram of a vibration tile device attached to an object according to at least one embodiment.

As will be explained further below, the tile device 10 may be attached to an object 11 to thereby acquire vibration data from the object 11 (shown in FIG. 1B). The object 11, in some examples, is one of a toilet, sink, garage door, trashcan, piece of exercise equipment (e.g., a treadmill), dumpster, furniture, door, appliance, article of clothing, boat, part of a marina (e.g., a dock), bed, and chair. It is understood that other objects discussed herein are included in the object 11. Furthermore, it is understood that the object 11 encompasses other objects known to those of skill in the art.

According to certain embodiments, the tile device 10 is waterproof or at least water-resistant.

The controller 16 is electrically coupled to each of the vibration sensor 12, the wireless transmission module 14, and the power unit 18. To keep the manufacturing costs low, in certain embodiments, the controller 16 can embody a microcontroller and not a central processing unit (CPU) as is typically found in more complex devices like smartphones and laptops. Using a microcontroller not only keeps cost low, but also can reduce the overall power consumption of the controller 16, thereby increasing battery life.

The power unit 18 provides power to the vibration sensor 12, wireless transmission module 14, and controller 16. To provide such power, in some embodiments, the power unit 18 is equipped with either or both of a rechargeable battery or a non-rechargeable, but replaceable alkaline battery. In the case of a rechargeable battery, some embodiments include a Lithium-Ion battery in the power unit 18. In some examples, the vibration tile device 10 includes a charging port that may also provide data transmission capabilities (e.g., micro USB, mini USB, USB-C).

In certain examples, the power unit 18 may include a receiver to wirelessly receive power from an external transmitter. This feature provides a wireless charging feature for the vibration tile device 10. The receiver and the transmitter each may include a coiled wire to electromagnetically transfer power from one coil to the other through electromagnetic induction. A benefit to wireless charging is that the vibration tile device 10 no longer requires a port or other user-accessible compartment for charging the device 10. Such a vibration tile device 10 would therefore be sealed from humidity, rain, submersion in water, and accidental spills. The wireless charging may be selectively bidirectional. For example, an external device provides power to the vibration tile device 10 or one vibration tile device 10 provides power to another vibration tile device 10.

In certain examples, a waterproof coating is provided to waterproof the vibration tile device 10. The waterproof coating can be applied to the internal electronics, and may include waterproof materials, such as a resin, epoxy, silicone, urethane, acrylic, para-xylylene, fluoropolymer, or other waterproof coating or gel that fills an inner cavity of the vibration tile device 10. A benefit of providing such a waterproof coating or gel is to prevent the internal electronics from being corroded, which is particularly important in outdoor applications. Outdoor applications include affixing a dumpster with the vibration tile 10.

The vibration sensor 12 includes one or more motion sensors having one or more of a displacement sensor, a velocity sensor, and an accelerometer. Accelerometers translate vibrational energy into an electrical signal that can be interpreted by a controller as corresponding to an acceleration, frequency of vibration, change of position, and/or orientation. In the case of an accelerometer with multiple axes or multiple accelerometers measuring different axes of vibration, the vibration sensor can provide data indicative of a two or three-dimensional vector of acceleration (with two or three axes of measurement respectively), or a two or three-dimensional vibration or change in position or orientation. An accelerometer may measure the amount and frequency of vibration in a given system, machine, or piece of equipment. The vibration sensor 12 is, in certain examples, based on piezoelectric, piezoresistive, and capacitive MEMS (microelectromechanical systems), strain gauge (e.g., spring), and capacitive displacement (e.g., eddy current).

The wireless transmission module 14 is configured to wirelessly transmit vibration data acquired from the vibration sensor 12 over a network using a communication protocol. The communication protocol may be Wi-Fi (e.g., 802.11ac), Bluetooth, Near Field Communication (NFC), Z-Wave, LoRa, or cellular (e.g., LTE or 5G) protocol. It is understood that other suitable radio frequency wireless protocols are also contemplated herein. When the vibration tile device 10 is wirelessly connected to a data network device (e.g., an edge-compute, repeater or gateway device) via the wireless transmission module 14, a link is established between the tile device 10 and the network device such that vibration data is readily streamed from the tile device 10 to the network device. As used herein, "network device" and "gateway device" are considered interchangeable terms. In some examples, the streaming occurs in real-time or near real-time. In some examples, the wireless transmission module 14 predominantly transmits data as opposed to receives data, thereby improving its ability to sense and transmit real-time data without wasting bandwidth to receive data. In addition to the vibration data, the tile device may transmit supplemental information to the gateway device, such as remaining battery percentage or other status indications.

In certain embodiments, the controller 16 of the vibration tile device 10 can be configured to automatically push out a low battery status indication when the battery percentage falls below a predefined threshold.

As will be discussed in more detail below, the vibration tile device 10 in certain examples is used in combination with an application-specific profile that translates certain vibration data (e.g., frequency, power magnitude, duration) as characteristics of an event (e.g., closing a lid, opening a door). The profile, in some embodiments, is stored in a remote location (e.g., a gateway device). In other embodiments, the profile is stored on the vibration tile device 10. The profile may be stored in non-volatile memory of the tile device 10, for example. To facilitate the translation of input data to higher level events, the controller 16 or other processing device on the vibration tile device 10 uses the stored profile to determine events from the acquired vibration data. In some examples, the wireless transmission module 14 is part of a radio which includes a processor suitable for using the profile to determine events from the acquired data.

Figure 2:
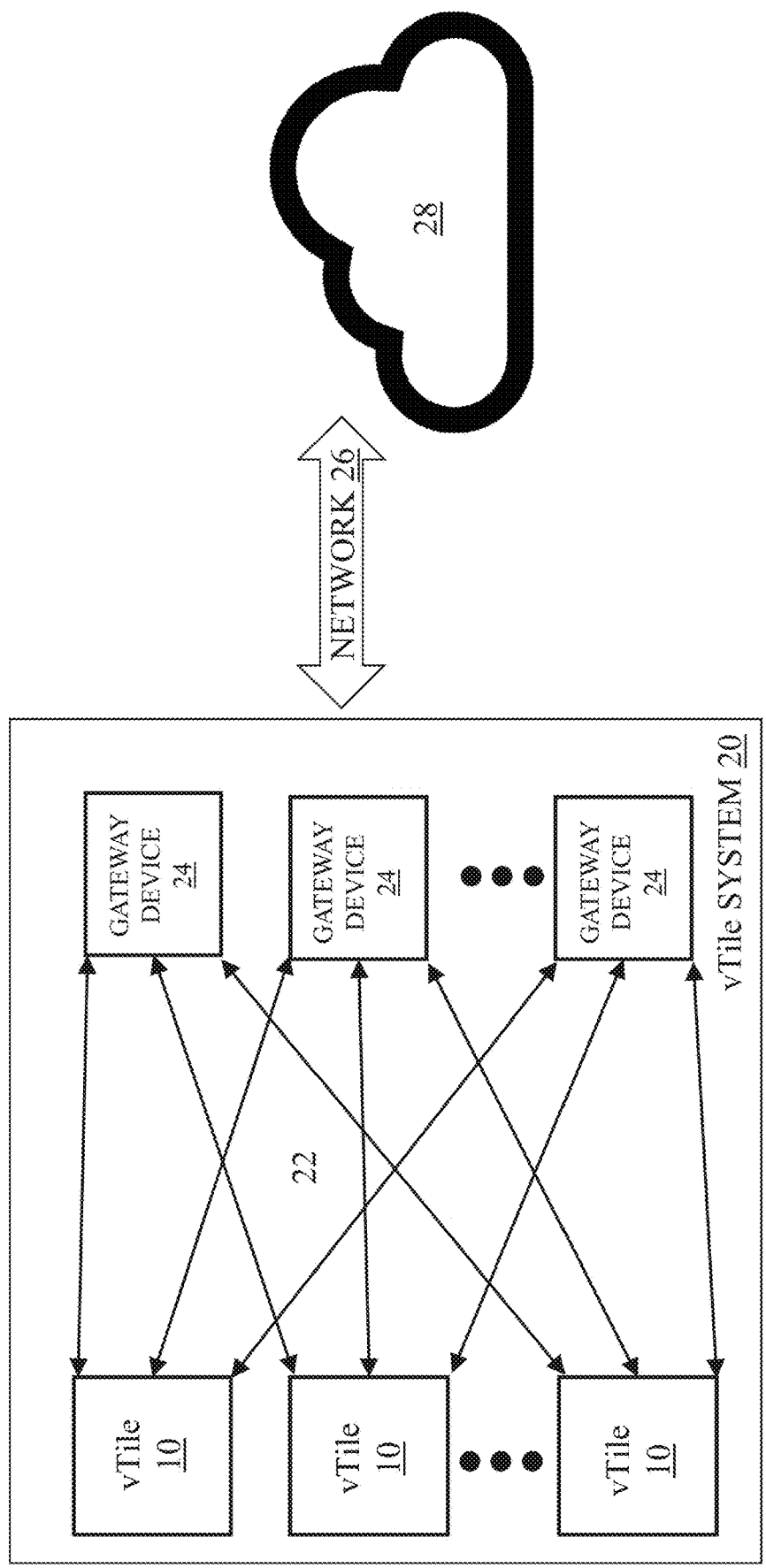
FIG. 2 is a functional block diagram of a vibration tile system according to at least one embodiment.

FIG. 2 is a functional block diagram of a vibration tile system 20 including a plurality of vibration tile devices 10, a plurality of wireless links 22 between the tile devices 10 and a plurality of gateway devices, each indicated at 24, a network 26, and a remote storage and computing environment 28. In one example, the network 26 is the Internet. In other examples, the network 26 is a local network. In still other examples, the network 26 is a subset of the Internet. Each tile device 10 can be configured to communicate with one or more of the gateway devices 24 via a wireless protocol as described above. The vibration data acquired by each tile device 10 is wirelessly transmitted to its associated gateway device 24, which in turn pushes the data directly over the network 26 to the computing environment 28 for processing and/or storage.

In certain examples, one or more of the gateway devices 24 is an Internet-of-Things (IoT) gateway, which is an intelligent central hub for IoT devices that connects devices within the Internet of Things to one another and to the cloud, translating communication between the devices and filtering data into useful information. In other examples, the IoT gateway acts as an edge-compute device, which offers local processing and storage as an ability to autonomously control the tile devices 10 based on data the IoT gateway receives from the cloud or the tile devices 10 themselves. Embodiments are not limited to IoT gateways and the gateway devices 24 may also include other gateway devices such as smartphones, tablets, laptops, desktops, and routers.

In certain embodiments, the vibration tile device 10 is configured to only stream vibration data to a gateway device 24 and not perform any substantial processing of the data locally. Certain applications do not demand immediate processing and analysis of the acquired data, which can be processed remotely at a later time. In such applications, the controller 16 facilitates the acquisition and packaging of data from the vibration sensor 12 to be transmitted using the wireless transmission module 14 without locally storing the data in the tile device 10 or performing any classification or recognition on the acquired data. In these circumstances, the vibration tile 10 device is provided with a low-cost controller 16 in the form of a microcontroller or like (as opposed to an Intel or AMD computer or laptop grade processor) and no or minimal local storage is provided. This streamlined approach has several benefits: cost is kept low and complexity is kept low, thereby reducing the possibility of processing errors or data being lost or corrupted in the local storage.

The controller 16 is, in certain examples, a processor (e.g., microprocessor, CPU). The processor may be located in one or more different locations where it analyzes the vibration data and compares the vibration data to a profile of events corresponding to vibration data. The profile itself may be stored locally in the vibration tile device 10, stored in the gateway device 24, and/or stored in the environment 28. The processor can be located in the cloud (e.g., the computing environment 28), in the gateway device 24, or in the vibration tile 10 itself. In the latter case, in one example, the wireless transmission module 14 communicates a characterization or summary of the vibration data, rather than the raw vibration data. The summary data may include counts of characterized events and corresponding time/date stamps (e.g., event start, stop time stamps). The summary data may also or alternatively include time-frequency analysis such as event duration, average and maximum signal amplitudes, dominant and secondary frequencies, and characteristic components at dominant and secondary frequencies. In some embodiments, the processor and profile can both be located in the cloud (e.g., the environment 28), in the gateway device 24, or in the vibration tile 10 itself.

In certain embodiments, the vibration tile device 10 is square in shape, with sides of equal length. In an example, the length is configured to permit the vibration tile device to be held and attachable to a surface with one hand (i.e., portable). However, it should be understood that the vibration tile 10 can be configured in any shape or form that is tailored to a particular use of the device.

In certain embodiments, the vibration tile device 10 includes a single sensor—the vibration sensor 12. However, the vibration tile device 10 can be configured with two or more sensors.

In certain embodiments, the controller 16 only streams the acquired vibration data to a gateway device or wireless access point without performing any analysis or higher-level processing of the vibration data.

Figure 3A:
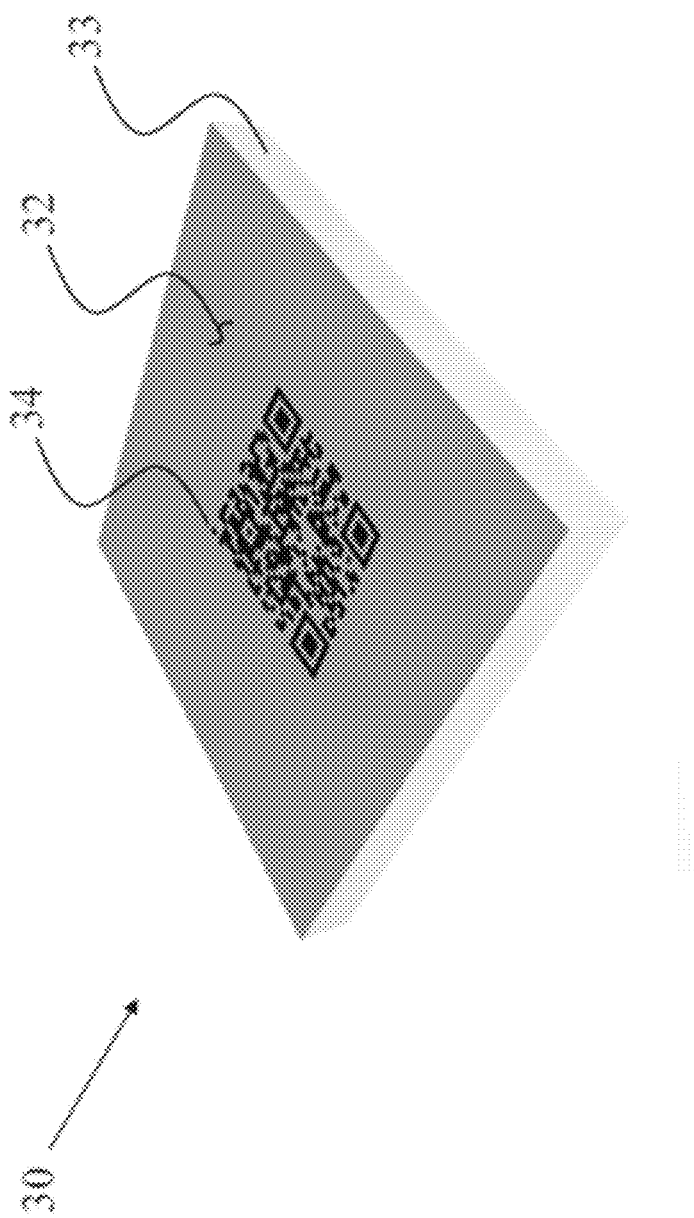
FIG. 3A is a perspective view of a vibration tile device according to at least one embodiment.
Figure 3B:
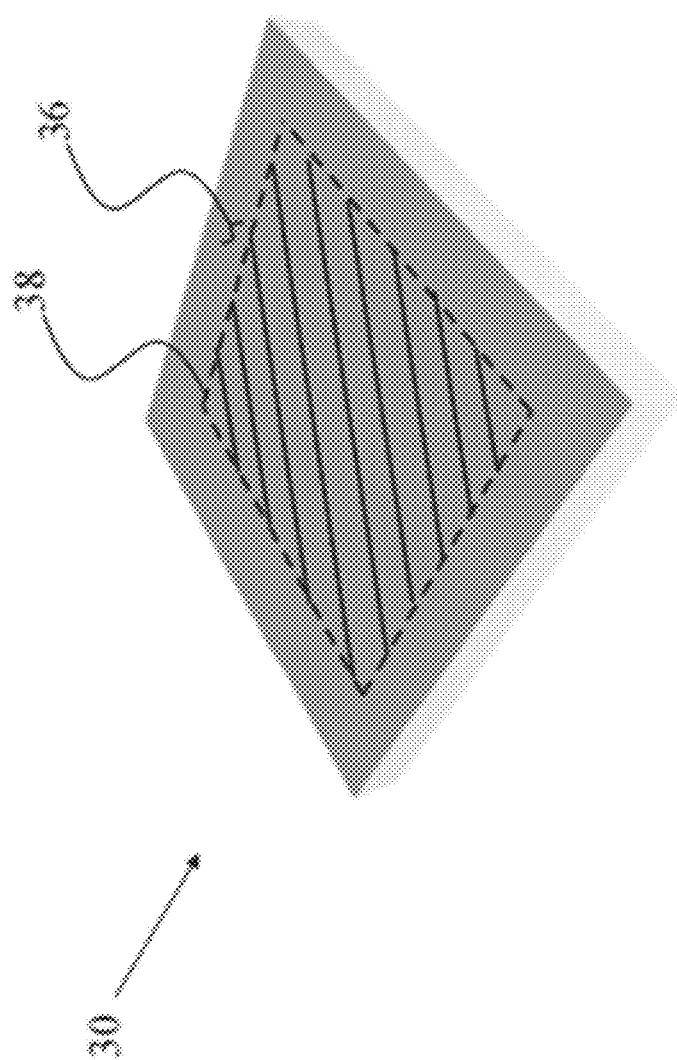
FIG. 3B is another perspective view of the vibration tile device of FIG. 3A.

In certain embodiments, the transmission module 14 of the vibration tile device 10 includes a single communication protocol for transmitting status such as vibration data or battery level and receiving configuration settings or instructions using a single radio-frequency transceiver. However, the transmission module 14 can also be configured with two or more radio-frequency transceivers, enabling the vibration tile device 10 to transmit and receive via two or more communication protocols. In one example, the transmission module 14 includes two different radio-frequency transceivers, the first as a long-range (LoRa) transceiver and the second as a Near-Field Communication (NFC) transceiver enabling the exchange of data over short distances with certain NFC-compatible devices such as smart watches or smart phones. In some examples, the LoRa may use Semtech's proprietary low-power wide-area network modulation technique for communicating with a LoRa-compliant gateway device FIG. 3A is a perspective view of a vibration tile device 30 (e.g., similar to the tile device 10). It is understood that all description of the tile device 10 is applicable to the device 30 unless otherwise stated and vice versa. The tile device 30 includes a top surface 32, a side perimeter surface 33, and a bottom surface 36 (shown in FIG. 3B, which is another perspective view of the tile device 30). In some examples, the top surface 32, side perimeter surface 33, and bottom surface 36 are included in a housing of the vibration tile device 30. The top surface 32 includes a QR code 34 attached thereto. The QR code 34 is configured to uniquely identify the specific tile device 30. The QR code 34 may be optically scanned, for example by a user opening the camera application on their smartphone, to thereby extract and decode the embedded data within the QR code 34. In other embodiments, an alternate serialized device identifier might be used rather than a QR Code, such as a bar code or serial number. After scanning the QR code 34, in some examples, the user is directed to download a specific application (e.g., from an App store), a website, or an existing application on the user's mobile device.

In other embodiments, the tile device 30 includes no QR code 34 and instead utilizes a wireless technology like a Near-Field Communication (NFC) transceiver on or under the surface 32 to identify the tile device 30 or associate the tile device 30 with a user. Other embodiments include a plurality of means to identify the tile device 30 and associate the device with a user. For example, the tile device 30 may include both the QR code 34 and an NFC tag.

Although shown in FIG. 3A to have a generally square shape, the vibration tile device 30 is, in other embodiments, generally round in shape. As mentioned above, it is understood that variations in shape, such as generally square but with rounded corners, are included in embodiments described herein.

The back surface 36 includes a bonding section 38 that is configured to temporarily or permanently affix the tile device 30 to a surface to acquire vibration data from the surface. In some examples, the bonding section itself is magnetic or a magnet is fixed on top of the bonding section 38. In other examples, an adhesive pad is fixed to the bonding section 38. Regardless of the specific type of material used to attach the tile device 30 to the surface, there should be as little flexibility in the coupling of the tile device 30 and the surface as possible in that when the surface moves or vibrates, the tile 30 should move or vibrate in the same way without allowing additional movement or reverberation due to the means of attachment, thereby ensuring the acquired data is accurate and representative of the real world vibration.

Particular implementations of the vibration tile device 30 are constructed according to specific dimensions and form factors. The overall geometry of the vibration tile device 30 may be arranged according to a particular aspect ratio such that it has a thin profile or height after being adhered to a surface. Such a thin or low profile provides the benefits of the vibration tile device 30 being less obtrusive and less likely to be accidentally knocked away from the surface. In an implementation where the vibration tile device 30 has a generally rectangular shape, the two largest dimensions (i.e., length and width) that are roughly parallel with the surface have a ratio of 1:1, 1:2, or 1:3, and a thickness or height from the surface between 2 mm and 100 mm. In one example, the two largest dimensions of the vibration tile device are about 38 mm each and the height is about 7 mm Other shapes and geometries of the vibration tile device 30 are included in embodiments provided herein. In an example, the geometry is round with a thickness of about 7 mm. In another example, the geometry of the vibration tile device 30 is an N-sided symmetrical polygon, where N is 3 or greater, with a thickness in the range between 1 mm and 10 mm.

Figure 4:
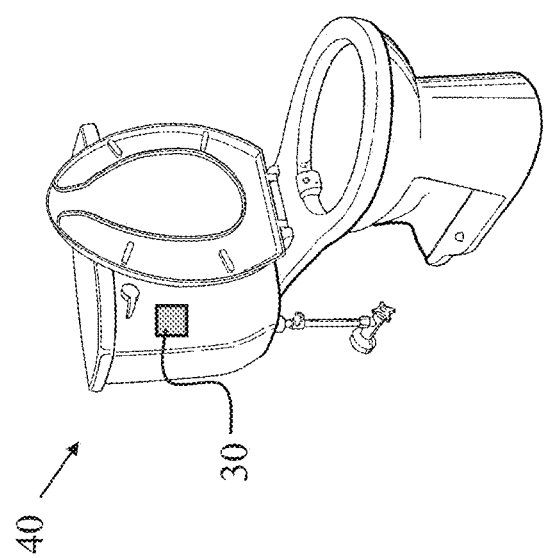
FIG. 4 is a perspective view of a vibration tile device attached to a toilet according to at least one embodiment.
Figure 5:
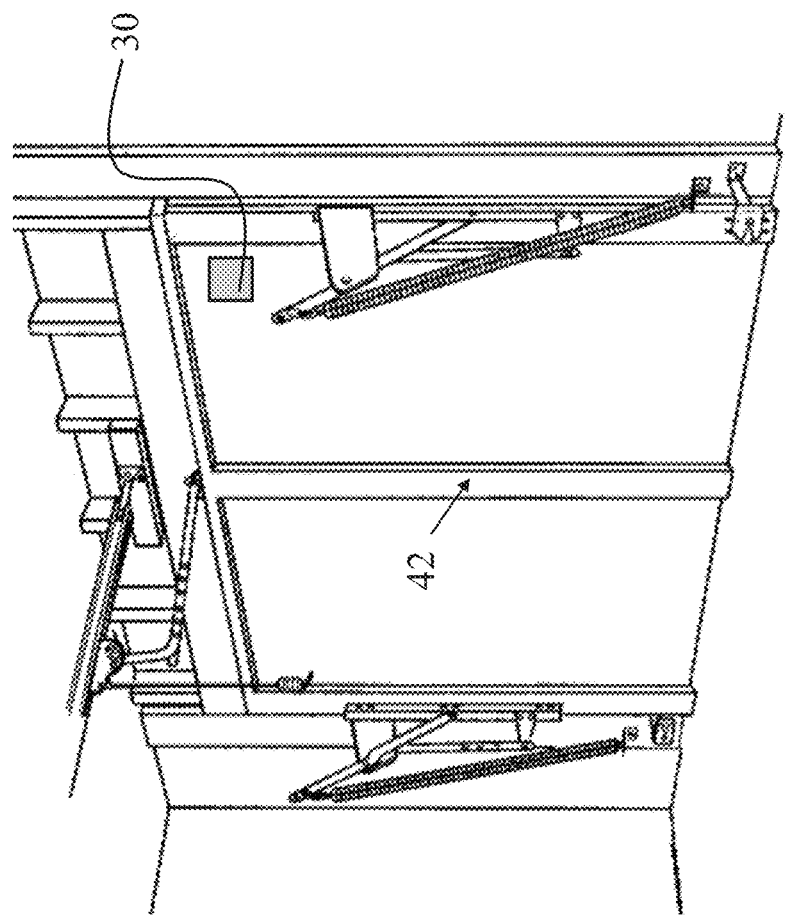
FIG. 5 is a perspective view of a vibration tile device attached to a garage door according to at least one embodiment.
Figure 6:
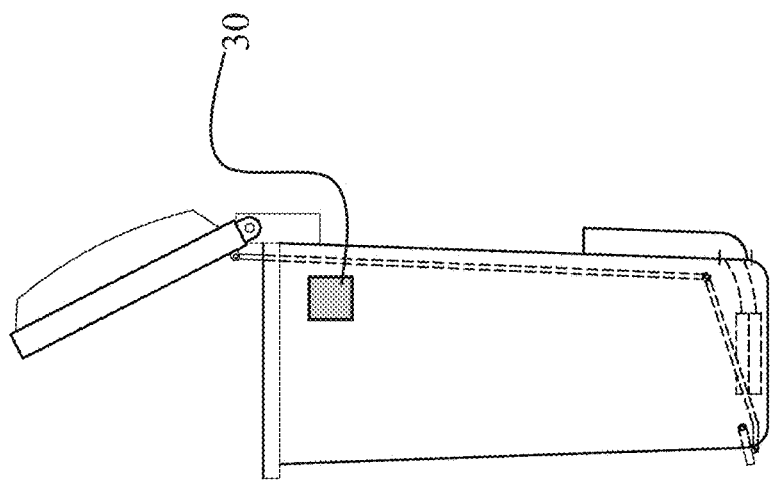
FIG. 6 is a perspective view of a vibration tile device attached to a trashcan according to at least one embodiment.

FIGS. 4-10 show applications of the tile device 30. It is understood that the possible applications are not limited to the examples described and shown herein. FIG. 4 shows the vibration tile device 30 attached to a toilet 40. FIG. 5 shows the vibration tile device 30 attached to a garage door 42. FIG. 6 shows the vibration tile device 30 attached to a foot-activated trashcan 44. In each of FIGS. 4-9, it is assumed that any optically scannable identifier (e.g., barcode, QR code) is facing outward and not into the object. Each unique object, whether it is the toilet 40, the garage door 42, the trashcan 44, or other examples provided herein exhibits unique patterns of vibration that are detectable by the vibration tile 30 and useable for a plethora of user-specific needs.

In certain embodiments, before acquiring vibration data from an object, each tile device 30 is calibrated or at least indexed in a database to identify what type of object the vibrations are expected to originate from. For example, when applying the vibration tile device 30 to the toilet 40, it may be necessary to distinguish between several toilet-specific actions such as flushing, raising or lowering the lid, the bowl refilling, and so on. A computing environment (e.g., the environment 28) may store one or more application profiles designated for specific applications. A toilet profile would thus be associated with the tile device 30 attached to the toilet 40 in FIG. 4. The toilet profile contains signatures that correspond to the various toilet-related events. When the computing environment receives vibration data from the tile device 30, the vibration data is compared to the stored profile to thereby process and/or categorize the data.

In certain embodiments, a user may use an existing profile to set up the tile device 30 or they may calibrate the device 30 themselves to create a custom profile. For example, assuming no existing toilet profile is available to a user, or a user wishes to create a new profile from scratch, or modify an existing toilet profile to be more specific to the user's toilet, a user may scan the tile device 30 using a smartphone to access an application to calibrate the tile device. The user may then commence with an action, such as flushing the toilet and then recording the vibration data acquired during the flushing event to the computing environment, which thereby stores the signature of the flushing event in association with the user-created category.

In addition to vibrational signatures, the vibration tile device 30 may be used to indicate positional changes and/or orientations of the surfaces on which the device is attached. For example, in FIG. 5, vibration signatures may indicate certain events, such as the garage door 42 opening or closing, but in addition, vibration data may indicate the garage door 42 has opened for a certain amount of time, has opened to a specific angle, or has opened by a certain distance.

The vibration tile 30 may be used to indicate a series of events in time. For example, as shown in FIG. 6, the tile 30 is attached to a trashcan 44. A user may wish to monitor how often their trashcan or recycling bin is used. A profile for the trashcan 44 may then store a series of vibration signatures that each corresponds to a use of the trashcan 44. The computing environment may then sort the collection of vibration signatures to provide useful information to a user such as how often the trashcan was accessed, on what days it was accessed, and at what times it was accessed. Information may be provided to the user in the form of an alert or notification indicating a specific event has occurred, for example the user may be notified a trashcan has been used, a toilet has been flushed, a garage door has been opened, and the like. Thus, the user is able to remotely monitor the device or machine via the attached vibration tile device.

The vibration tile 30 may also be used to indicate a series of events related to services provided by commercial contractors to their clients, so that the client of those services can monitor the performance of the contracted service provider. For example, a trash dumpster 51, shown in FIG. 10, may be deployed at the back of a restaurant by a trash hauling service provider, so that a restaurant or other business can dispose of trash during their business operations. The dumpster 51 includes a first lid 51a and a second lid 51b. It is understood that the vibration tile 10 is useable with dumpsters having more than two lids, one lid, or no lids. On a periodic basis, such as weekly, the contracted trash hauling company may send a truck to empty the dumpster, and then invoice their customer for the trash hauling service. The vibration tile 30 may be attached to the trash dumpster for purposes of monitoring related events. As trash is deposited into the dumpster, the vibration tile 30 may monitor and report on the number of trash deposit events which have a certain vibrational profile. When the trash hauling truck of the service provider arrives to empty the dumpster, the truck physically picks up and rotates or tilts the dumpster to pour the trash into the truck. The event of emptying the dumpster can be uniquely distinguished from normal trash deposit events using a pre-defined vibrational profile which includes vibrational characteristics consistent with the lifting and rotation of the dumpster. The event designating the emptying of a dumpster can then be communicated to various parties for business purposes, such as confirming service completion, monitoring compliance to contracted service metrics, and triggering payment by the client for the rendered services.

For the dumpster application described above, the vibration tile 30 may be trained to recognize events unique to dumpsters of a certain type or an individual dumpster. Before relying on the vibration tile 30 for providing event information to a user, the vibration tile 30 first may be attached to the dumpster 51 and then in a training procedure, have a user repeatedly close and open the lid(s) 51a, 51b of the dumpster 51. The opening event data generated by the vibration tile 30 is then associated with a profile that associates a given frequency, duration, intensity, or other vibration data with the act of opening a lid. Similarly, a profile of data corresponding to a closing event is stored for future comparison to recognize a closing event. For dumpsters with any lids or dumpsters with any number of lids, the act of garbage being thrown into a dumpster as a distinct event from opening/closing a lid is trained by a user creating training data corresponding to throwing one or more objects into the dumpster, which is then used to form a profile to describe the event of tossing in one or more objects. Other trainable events include rolling or moving the dumpster to another location and the dumpster being picked up and emptied by a trash truck. An advantage of the vibration tile 30 is its ability to operate without additional electrical or mechanical devices attached to the dumpster 51. For example, there is no need to attach a motor or other vibration device to the dumpster to induce vibrations to be picked up by the vibration tile 30. In certain use applications, a user may wish to receive reports on a periodic basis that inform the user of how many times the dumpster was emptied or dumped. In an example, a dumpster monitoring system is provided that continuously monitors a vibration tile 30 attached to a dumpster. The vibration tile 30 pushes vibration data to the cloud every time the dumpster 51 is emptied. A processor interprets the data as corresponding to a dumping event. For a given period of time that is either preselected or customized by a user, such as every week, the processor then counts the total number of times the dumpster was emptied in a week and then transmits a report to the user indicating how often the dumpster was emptied in the last week.

As described above, the vibration tile device 30 has a plethora of uses for the individual user. The vibration tile 30 may also be used to monitor the activities of one or more people as they progress through a daily routine or series of predefined work tasks. For example, at-home health and supportive care are provided to elderly or medically-compromised individuals by family members or professional care givers within individual homes where care recipients live. Twenty-four hour care is sometimes unnecessary due to semi-independence or infeasible due to cost. Consequently, chronically ill or elderly care recipients often live alone, with the care giver visiting on a daily or weekly basis to provide assistance.

The vibration tile 30 is used, in certain embodiments, to monitor particular activities of daily living that the care recipient must do by themselves to engage independently in everyday life, including bathing, dressing, eating, being mobile, moving in or out of a bed, sitting in a chair, or using a toilet or sink. Within the independent living environment, the vibration tile 30 can be affixed to furniture, fixtures, appliances, doors and other items (i.e., examples of the object 11), with which the care recipient interacts on a daily basis as part of the care recipient's normal routine.

In certain embodiments, one or more vibration tiles 30 may be present within the care recipient's independent living environment to monitor their progress through daily activities. For example, the vibration tiles 30 may be attached to the care recipient's bed, plumbing valve of the toilet or sink, a television remote control, a favorite chair, primary doors for ingress and egress, a garage door, and a mailbox (i.e., examples of the object 11). A corresponding pattern of activity on a typical day may show recognizable motion-based events across the installed vibration tiles 30, including when the care recipient wakes up and rises from bed, uses the bathroom for personal relief and cleaning, turns on the television, exits the front door to retrieve the morning newspaper, and sits down for breakfast. Vibration tiles 30 placed on bedroom drawers and closet doors may indicate the withdrawal of clothes to dress, as a vibration tile 30 on the garage door may indicate its opening, and a vibration tile on the care recipient's vehicle may indicate the starting of a car engine.

The care recipient may permit a care giver to monitor data associated with installed vibration tiles 30. In an example, such data enables the care giver to remotely confirm the performance of the care recipient's normal daily activities. The care giver may receive alerts based on the absence of normal daily events, such as rising from a bed in the morning, using the toilet, or opening a door. The care giver may also receive alerts based on the presence of abnormal events, such as the opening of an exterior door in the middle of the night.

Care recipients may use assistive technology devices that improve a person's ability to live and function independently. These assistive devices may include simpler devices like canes and pill organizers, or more complex devices like electric wheelchairs, hearing aids and smartphones. The vibration tile 30 enables the monitoring of the care recipient's use of such devices, by affixing the vibration tile 30 to an assistive technology device or a container or storage location associated with the assistive technology device. In an example, the vibration tile 30 is affixed to a cane which is likely to be picked up or used by a care recipient one or more times per day. In another example, the vibration tile 30 is affixed to a pill organizer so the care giver may monitor the care recipient's compliance to a doctor's medicine prescription.

A care giver using the vibration tile device 30 may monitor activities of care recipients in assisted living facilities, continuing care retirement communities, health care, and rehabilitation facilities. The vibration tile 30 is used to monitor the activities of care recipients across a spectrum of housing and health facilities that offer a variety of living options and services, including independent living, assisted living, and skilled care, often all on the same campus to meet the changing needs of care recipients. The vibration tile 30 is also usable by care givers whose relationship to the care recipient includes family relatives, health aides, partners, friends, neighbors, and those who are elderly or encumbered with a chronic or disabling condition.

As part of a personal emergency response system (PERS), also known as a medical alert system, the vibration tile 30 provides additional reliability for determining that medical assistance is needed. Such alarm systems are designed to permit a care recipient to signal a medical or personal emergency they are experiencing, often by pushing a button. These systems often feature an emergency response center that monitors calls. Care recipients subscribed to such services, events and alerts associated with vibration tiles 30 may permit the PERS to identify emergency events, even when the care recipient is unconscious or otherwise unable to signal an emergency.

As part of a remote patient monitoring (RPM) system, including telehealth services, the vibration tile 30 allows patients to use mobile medical devices and technology to gather patient-generated health data and send it to health care professionals. Such systems facilitate the remote collection of common physiological data such as weight, blood pressure and heart rate. In this context, the vibration tile 30 may be integrated with RPM systems to monitor activities associated with the compliance to medical instructions, such as following a prescription, using home-based medical equipment, or performing a physical therapy or exercise regimen.

In certain embodiments, the vibration tile 30 is used in a PERS, RPM or other care recipient monitoring system that also tracks the Universally Unique Identifier (UUID) of the Bluetooth radio within the cell phone of the care recipient. While the vibration tile 30 may be integrated with the monitoring system to track certain daily activities of the care recipient, the monitoring system would also track the presence or absence of the care recipient's cell phone, by looking for the Bluetooth UUID associated with that phone. For example, if one or more vibration tiles 30 indicate the absence of normal daily activities within the care recipient's living space, the simultaneous absence of the care recipient's wirelessly broadcasted Bluetooth UUID may indicate that the care recipient is not at home, enabling the monitoring system to avoid a false positive alert that would have resulted in actions to confirm the wellness of the care recipient. Similarly, the absence of normal daily activities reported by the vibration tiles 30 combined with the presence of the care recipient's Bluetooth UUID within the care recipient's living space, may indicate that the care recipient is at home, unable to perform normal daily activities, and therefore in need of medical or physical assistance.

In certain embodiments, one or more of the vibration tiles 30 is deployed to monitor the service compliance of equipment or vendors within their client's workspace. For example, a restaurant may hire multiple service subcontractors to perform various services, including emptying a trash dumpster, cleaning a bathroom, washing floors, or changing bag-in-box syrup containers for the soda dispenser. Individual vibration tiles 30 may be attached to equipment, storage locations or other objects (i.e., examples of the object 11) with which the subcontractor representatives interact as part of their contracted service delivery. Performance events reported from the vibration tiles 30 are useable by the restaurant manager or his accounts payable group to confirm service performance or compliance to service standards, as a requirement prior to payment of the service subcontractor's invoice. Similarly, such event data from one or more vibration tiles 30 can be used to present a "service report card" to monitor and provide feedback on performance of subcontractors over time. Such data from the vibration tiles 30 may be integrated into the service or vendor management system and practices of the client organization.

The described uses of the vibration tile 30 and a Bluetooth UUID are not limited to those embodiments described herein. Applications of the vibration tile 30 and Bluetooth UUID extend to the tracking of a wide range of services or activities including actions that generate vibration or motion as individuals or equipment perform their function in many environments, including home, retail, work and leisure.

In addition to individual users, provided herein are vibration tiles, systems, and methods used for enterprise level applications. For a gym studio, such as a cycling studio for example, a common problem facing studio owners and managers is the tradeoff between greenfield and brownfield investments. With greenfield investing, a company builds its own facilities and/or equipment from the ground up. This may include, in the context of a cycling studio, buying brand new bikes that interface with users' smartphones or a local network to replace outdated bikes without such technological capabilities. With brownfield investing, a cycling studio owner would look towards adapting existing equipment to suit their needs. The vibration tile device 30 provides a brownfield solution to gym facilities, including cycling studios. As discussed above, it is far more cost effective to utilize the vibration tile device 30 in a brownfield solution than it is to completely replace all gym equipment incapable of communicating with user devices or the Internet. Furthermore, using a plurality of vibration tile devices 30 in a gym setting provides the gym owner or manager with added value to offer existing or future customers. The term "brownfield" is also used to describe exercise equipment that is not capable of connecting to a network on its own.

In some examples, the vibration tile system 20 is implemented in a fitness facility or gym where one or more vibration tile devices 30 are attached to some or all pieces of gym equipment within the facility.

Gyms and specialty fitness facilities like cycle studios often offer mobile applications for members to download to track their attendance, schedule classes, or view workout-specific information like the member's heart rate during a workout. From a user's perspective, in at least one embodiment, the vibration tile device 30 is configured to provide data directly or indirectly to the user's mobile application ("app") for the particular studio. In some embodiments, the vibration tile device 30 includes a Bluetooth module capable of forming a link with a user's smartphone or smart watch to stream vibration data directly to a mobile app, which is then processed and presented to the user. In other embodiments, the vibration data is streamed to a local wireless device within the studio or facility, like a router or other wireless access point, to then is pushed to a cloud computing environment for processing and/or storage. Whether stored on a user's mobile device, an on-site edge-computer device, or in the cloud, the user can track their usage and time intervals of the equipment they used during their workout(s). Furthermore, the user is provided with data specific to each workout. In an example, the vibration tile device 30 provides data that is processed to provide a report of how much the user's bike swayed back and forth during the ride compared to a predefined level indicating a maximum amount of sway.

From a gym facility manager's perspective, in at least one embodiment, a manager is provided with access to the data collected from any number of the vibration tile devices 30. In some examples, the manager is able to see all data streamed from the tile devices 30. In an example, the manager tracks utilization of machines within the facility by viewing the usage data pushed out by the vibration tile devices 30. The manager is then able to see which machines are being used, the frequency of usage for each machine, the duration of each use, the duration between different uses, at what time machines are being used, and so on. For machines that exhibit a predefined behavior, such as being in a section of the facility that sees high usage yet a specific machine within the section is not being used at all or very infrequently for a certain period of time, an alert may be pushed to the facility manager indicating a machine may be in need of service. Other predefined alerts may be sent to a facility technician and upon further lack of usage of the specific machine, the facility manager is then notified of the problem. These types of predefined alerts would greatly reduce machine down time and open up more time for managers to complete other tasks.

From a corporate gym manager's perspective, in at least one embodiment, daily, weekly, monthly, or yearly reports (or any customizable time period) on equipment usage may be generated, thereby allowing optimal equipment layout of individual facilities that are part of a national chain of facilities. A problem with large chains of fitness facilities is that a single standard applied across all facilities does not necessarily yield the best results for individual facilities. For example, one facility may see much higher use of treadmills whereas another may see much higher use of weight-lifting equipment. Therefore, such data provides the means to optimize individual facility layouts of equipment and when certain types of equipment need to be serviced. Furthermore, receiving a report of the equipment utilization in each individual facility compared to the national average enables the corporate manager to quickly identify which facilities are performing better than others without having to communicate directly with facility managers.

In the context of gym equipment or home exercise equipment, a plurality of predefined workout activities may be stored either locally on a user's mobile device or in the cloud. Upon receipt of vibration data from the vibration tile device 30, the vibration data is compared with the plurality of predefined workout activities to determine which activity or activities corresponds to the received vibration data.

Figure 7:
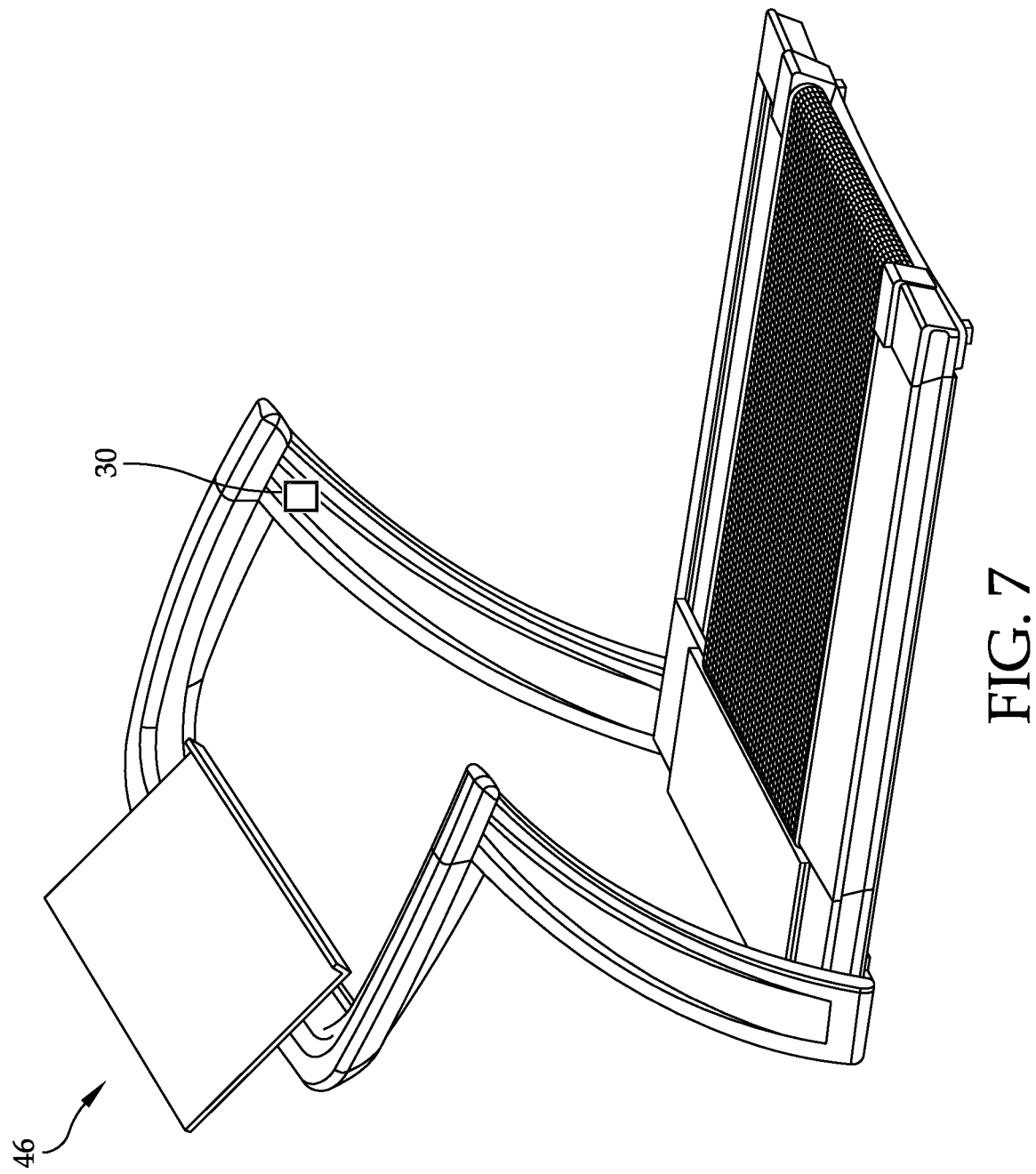
FIG. 7 is a perspective view of a vibration tile device attached to a treadmill according to at least one embodiment.

FIG. 7 is a perspective view of the vibration tile device 30 attached to a treadmill 46. In the context of the treadmill 46, predefined activities may include a user stepping on to the treadmill, running, walking, interval training, or stepping off the treadmill 46.

Figure 8:
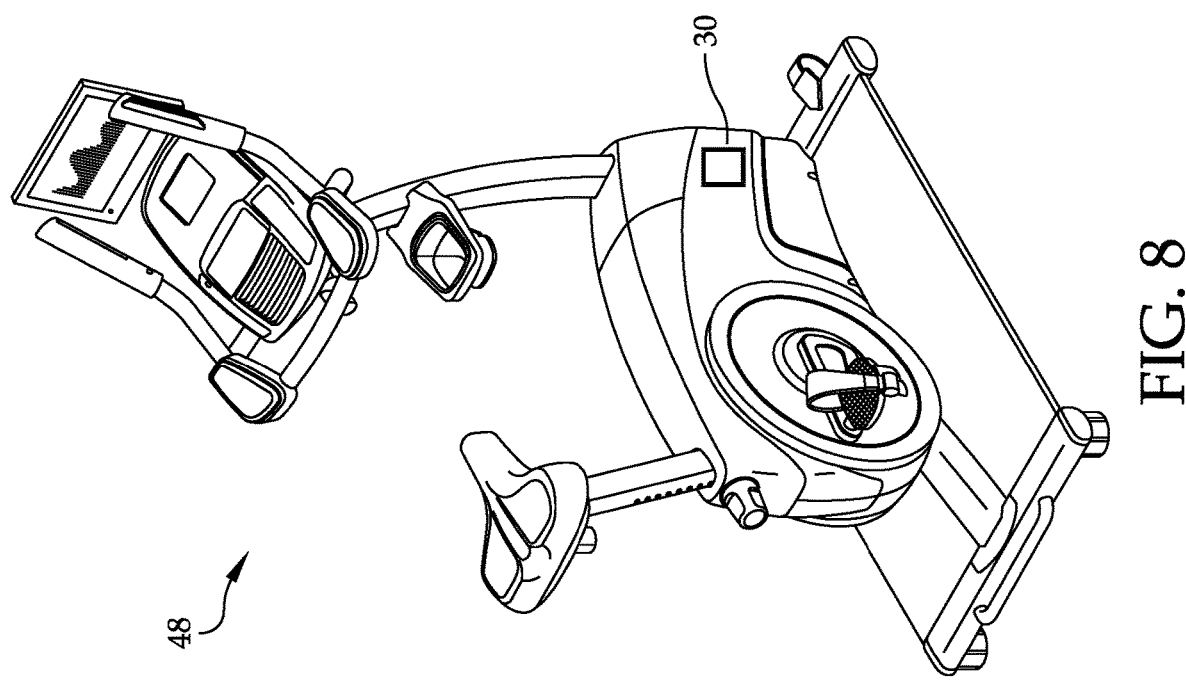
FIG. 8 is a perspective view of a vibration tile device attached to a stationary bicycle according to at least one embodiment.

FIG. 8 is a perspective view of the vibration tile device 30 attached to a stationary bicycle 48. In the context of the stationary bicycle 48, predefined activities may include a user stepping on to the bicycle 48, clipping into the pedals if applicable, pedaling at a plurality of different speeds, pausing pedaling, or unclipping from the pedals.

Figure 9:
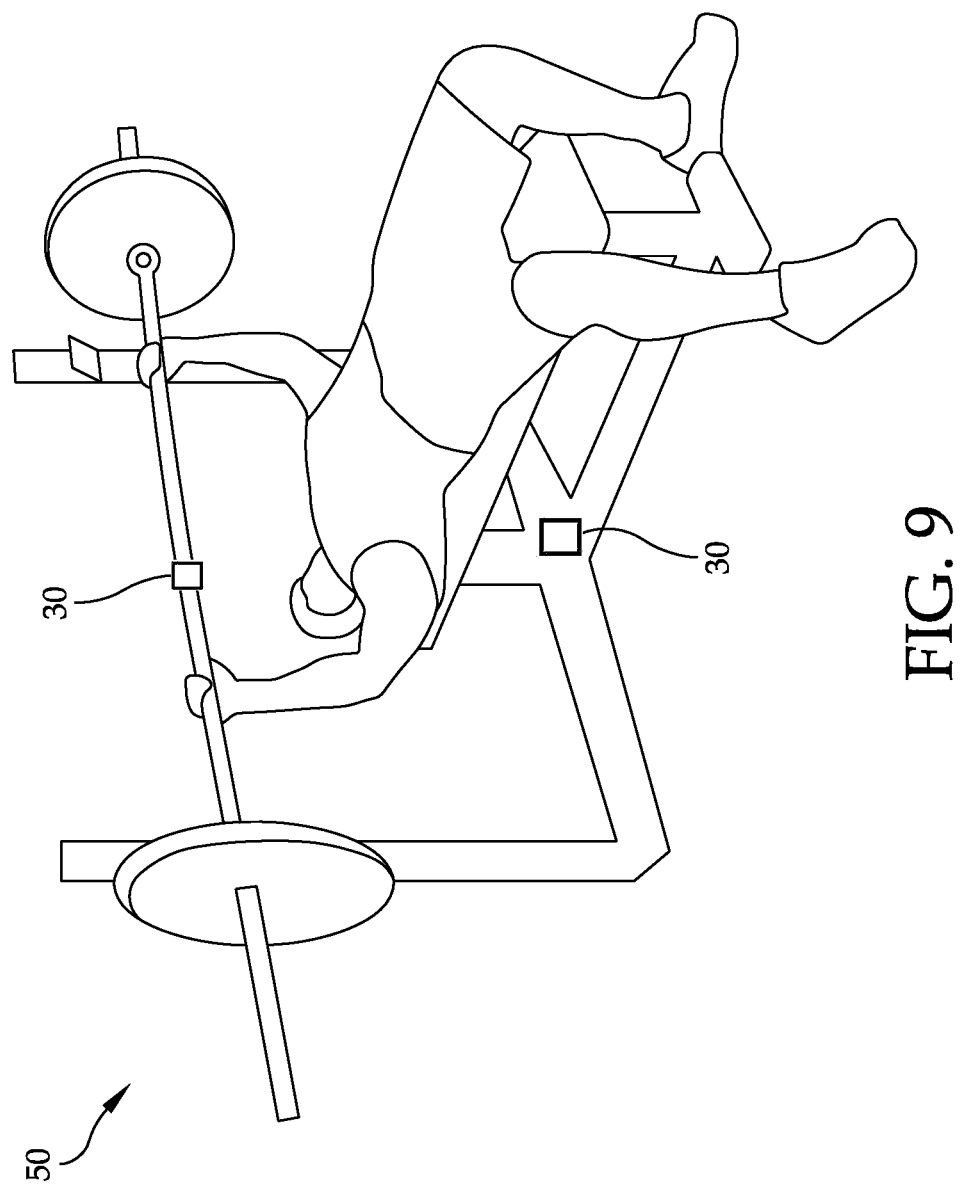
FIG. 9 is a perspective view of a vibration tile device attached to a bench press rack according to at least one embodiment.
Figure 10:
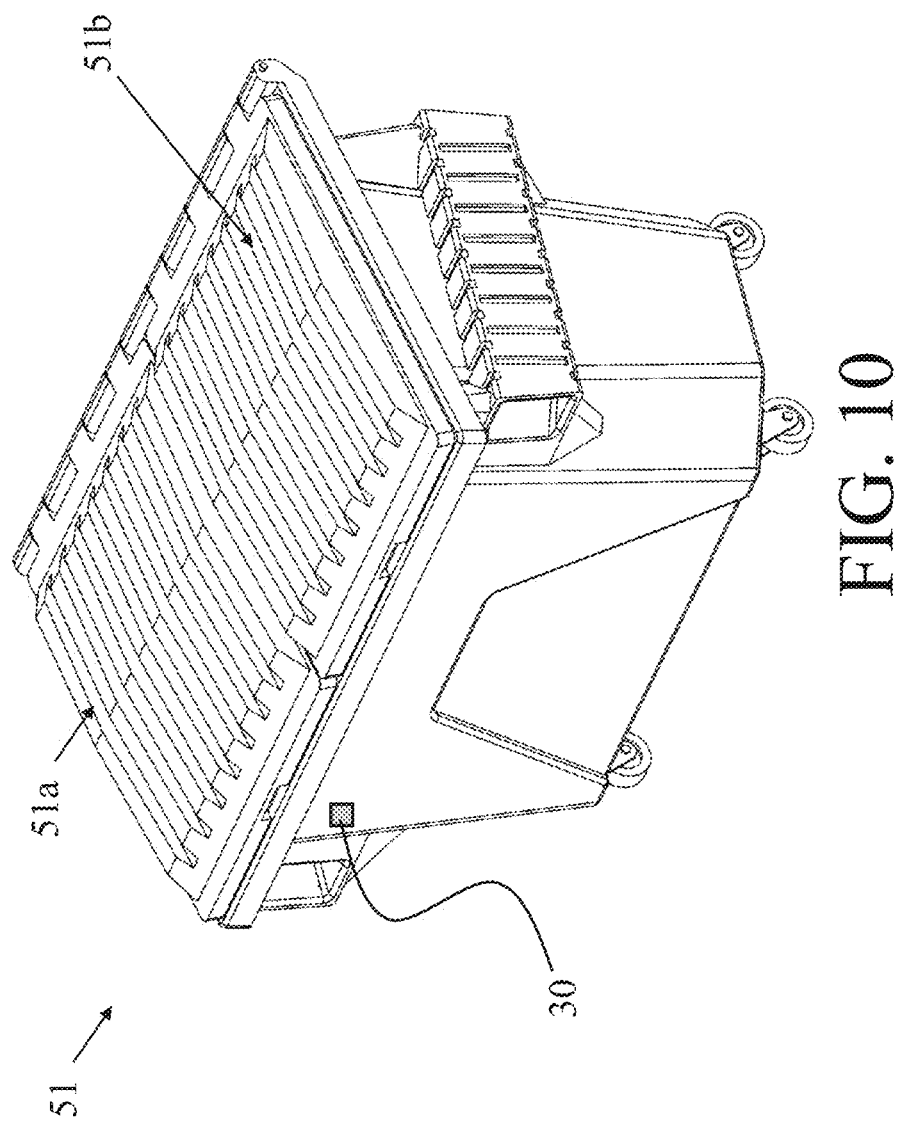
FIG. 10 is a perspective view of a vibration tile device attached to a dumpster according to at least one embodiment.

FIG. 9 is a perspective view of a first vibration tile device 30 attached to a bench press rack 50 at its base and a second vibration tile device 30 attached to the bench press bar itself. In the context of the bench press rack 50, predefined activities may include a user loading weights onto the bench press bar, a number of repetitions of the bench press bar, and a number of sets, and so on.

In each of these contexts, the user would first associate their personal profile or account with the specific piece of equipment either by connecting to the vibration tile device(s) 30 via Bluetooth or NFC, scanning a QR code on the tile device 30, or by other means. Once the user and the tile device 30 are associated, since the tile device 30 is already associated with the piece of gym equipment it is attached to before the user comes along, all of the user's workout data (vibration data) is easily associated with the specific workout they engaged in using the piece of gym equipment.

In certain embodiments, the user is automatically associated with the specific piece of equipment by the vibration tile device(s) 10 in FIG. 2 via Bluetooth, without the need for scanning or pairing. Once a user downloads a vTile-enabled mobile app for a fitness facility onto their personal smart device, a Bluetooth universally unique identifier (UUID) is associated with the user's mobile app as a unique radio-frequency identifier for that user. This UUID is stored in the environment 28 and downloaded onto the Gateway Device(s) 24 located within the fitness facility where the user is a member. When a vTile 10 on a workout station senses vibrational patterns that indicate the beginning of a workout routine, the vTile 10 reads one or more broadcasted Bluetooth UUIDs in the area and selects one or more UUIDs with the strongest power signatures, which indicate the relative proximity of the user to the vTile 10. The vTile 10 then associates the UUID of the closest user with the vibrational log of the workout activity, enabling the Gateway Device 24 to automatically receive the UUID of the user with the workout data.

In certain embodiments, the vibration tile 30 is used to monitor the activities of individuals as they progress through defined routines in industrial and commercial work environments. For example, vibration tiles 30 are used to monitor one or more of the activity of automotive mechanics in a car service center, the activity of housekeeping staff in cleaning guest rooms in hotels, the activity of maintenance technicians in commercial buildings, the activity of boat owners at a commercial marina, and the activity of pilots and maintenance technicians at private hangars of airports.

To track the authorized or unauthorized use of equipment, the vibration tile 30 is used in conjunction with broadcasted Bluetooth UUIDs. For example, at private and public marinas, privately-owned boats are stored in preparation for approved activities of authorized personnel. Vibration tiles 30 are installed on a mooring, wharf, boat lift, or any feature of the boat storage area, where activities of individuals are likely to generate motion or vibration. The vibration tiles 30 may also be installed within a boat, including on the engine cover, maintenance access panels, or on the driver's seat (i.e., examples of the object 11). The Bluetooth UUID of the cell phones of authorized users of a boat may be registered and associated with these installed vibration tiles 30, such association occurring within the data structure of the data system used to monitor said devices (e.g., the system 20 and/or remote storage and computing environment 28).

With vibration tiles 30 installed on or near boats and the Bluetooth UUID used to recognize the presence of authorized users of a boat, a marina management system is given the ability to monitor the authorized use of a boat or yacht. For example, the vibration tile 30 installed on, in or near the engine compartment of a boat may then be used to recognize a vibrational pattern consistent with the starting of the boat engine. The marina management system may be alerted to the starting of said boat engine by the vibration tile 30, while simultaneously being alerted to the presence of an authorized user of said boat via the broadcasted Bluetooth UUID of the user's cell phone. Such data-driven events may conclude that the operation of the boat is authorized, with no further action required, other than automatically registering that the authorized user has started the engine of their boat.

In another case of the scenario above, the marina management system may be alerted to the starting of the boat engine, while simultaneously checking for but not finding the broadcasted Bluetooth UUID of an authorized user's cell phone. Based on such data-driven events, the marina management system may send an automated message to the primary authorized user of the boat, alerting that user that the boat engine was started. In this same scenario, the Bluetooth UUID of the cell phones of certain employees of the marina may also be registered as authorized users of all boats at the marina. Such pre-registration of authorized marina employees may be done to avoid false-positive alerts sent to the boat's primary authorized owner upon the starting of the owner's boat.

The vibration tiles 30 may also be deployed within individual storage locations in a boat marina, such as on each wharf, storage rack, or mooring (i.e., examples of the object 11). The vibration tiles 30 may be trained to detect the presence or absence of a boat within the store location. Data that is wirelessly communicated from the vibration tiles 30 enables the live tracking of boat inventory or occupancy within designated storage locations. Through such use of vibration tiles 30, a marina management system may more efficiently coordinate resources within the dynamically changing environment of an active marina.

The vibration tiles 30 may also be integrated with a universal network gateway which is capable of collecting data from multiple sources using multiple communication protocols. The universal gateway would act as a universal translator, receiving data from one communication protocol and then relaying it to a remote monitoring service through, for example, a cellular LTE data service. This universal gateway may be capable of tracking wireless signals adhering to different radio frequency standards or protocols, such as WiFi, LoRa, Bluetooth and NFC. For example, a gateway capable of collecting data from vibration tiles 30 using a LoRa communication protocol, may also monitor for Bluetooth UUID transmitted from the cell phones of authorized and unauthorized individuals. Such a universal network gateway would be capable of tracking the performance of activities and events, and also associating them with individuals whose have pre-registered their personal cell phone's Bluetooth UUID.

In other embodiments the vibration tiles 30, associated Bluetooth UUID sensors, and universal gateway or network devices are used to track events, activities and the presence of individuals across a variety of home, industrial, and commercial applications. For example, one may deploy a similar system enabled with such technologies at airports and private hangars, automotive service centers, car rental agencies, and other environments where events and activities associated with important or valuable equipment are monitored and associated with pre-registered individuals that are interacting with said equipment.

Figure 11:
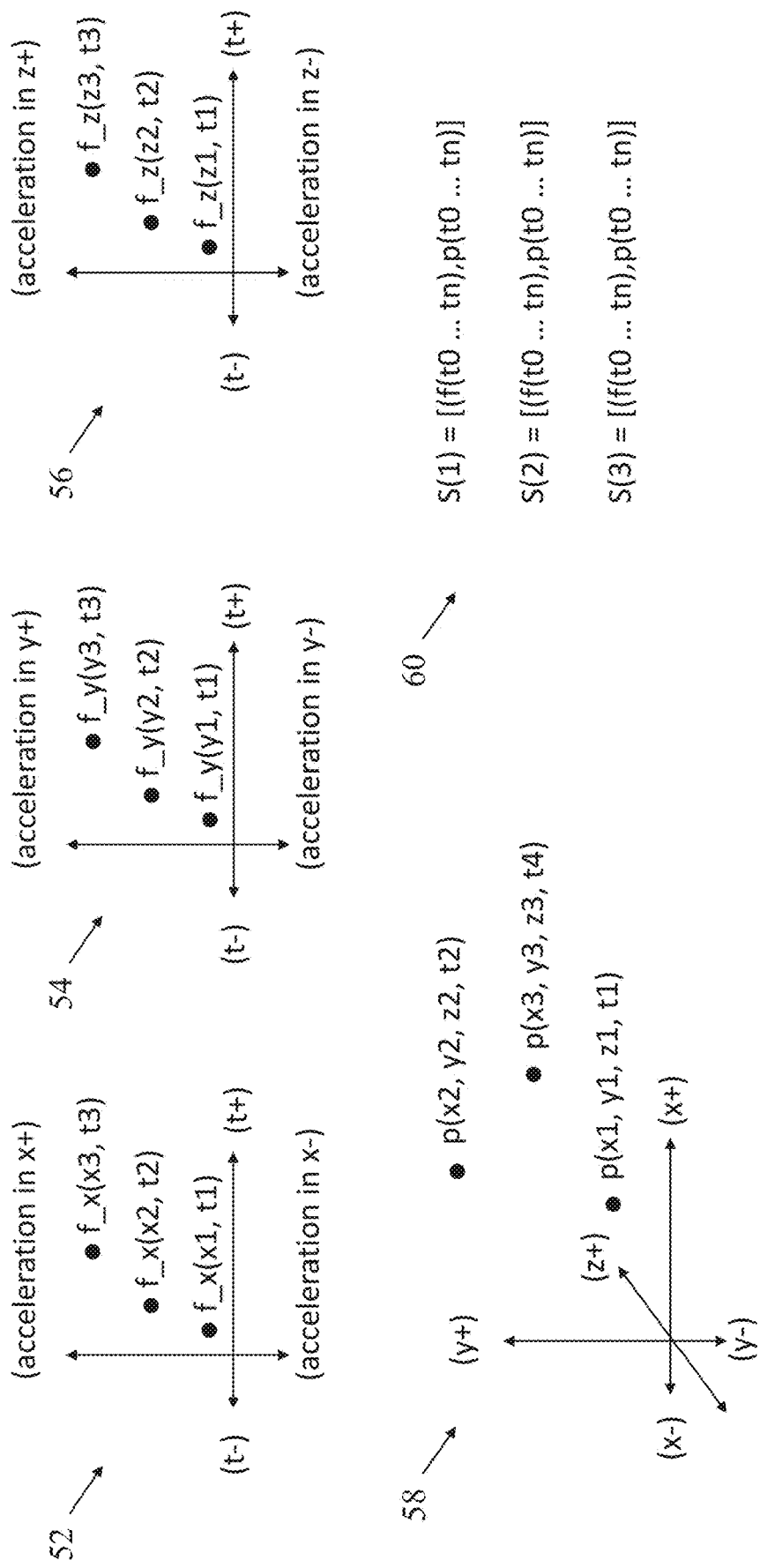
FIG. 11 is a collection of vibration data graphs according to at least one embodiment.

FIG. 11 shows a plurality of vibration data graphs including an x-axis graph 52, a y-axis graph 54, a z-axis graph 56, a positional graph 58 and an example of a series of vibration signatures 60 acquired from the tile device 30. The data within the positional graph 58 may be obtained directly from the vibration data or it may be derived from the vibration data. While these graphs provide one example of the type of data included in the vibration data or derived from the vibration data obtained by the vibration tile device 30, embodiments are not limited to this specific arrangement of data. Depending on the number of axes measured by the vibration sensor, for example, the vibration signatures 60 capture either the amount of acceleration in one or more axes and/or a relative position of the tile device.

In certain embodiments, the vibration data included in the vibration signatures 60 is used to perform frequency domain analysis. For gym equipment that includes a rotational component, such as the rotation caused by pedaling the stationary bicycle 48, a dominant frequency may be extracted from the vibration data to provide an estimate of the rotational speed. In an example, to determine the pedaling speed of a user on the stationary bicycle 48, the raw vibration data is first obtained. The raw data may be initially gathered as amplitude versus time, for example. This data, in an example, is then processed using a Fast Fourier Transform (FFT). The FFT output could then be processed to locate the frequency corresponding to the highest amplitude in the FFT output, which corresponds to the rotation speed of the pedals. The frequency analysis in some examples is performed locally on a user's mobile device and in other examples, the frequency analysis is performed in a remote computing environment (e.g., the computing environment 28). It is understood that other frequency domain analysis techniques are useable with the acquired vibration data.

Figure 12:
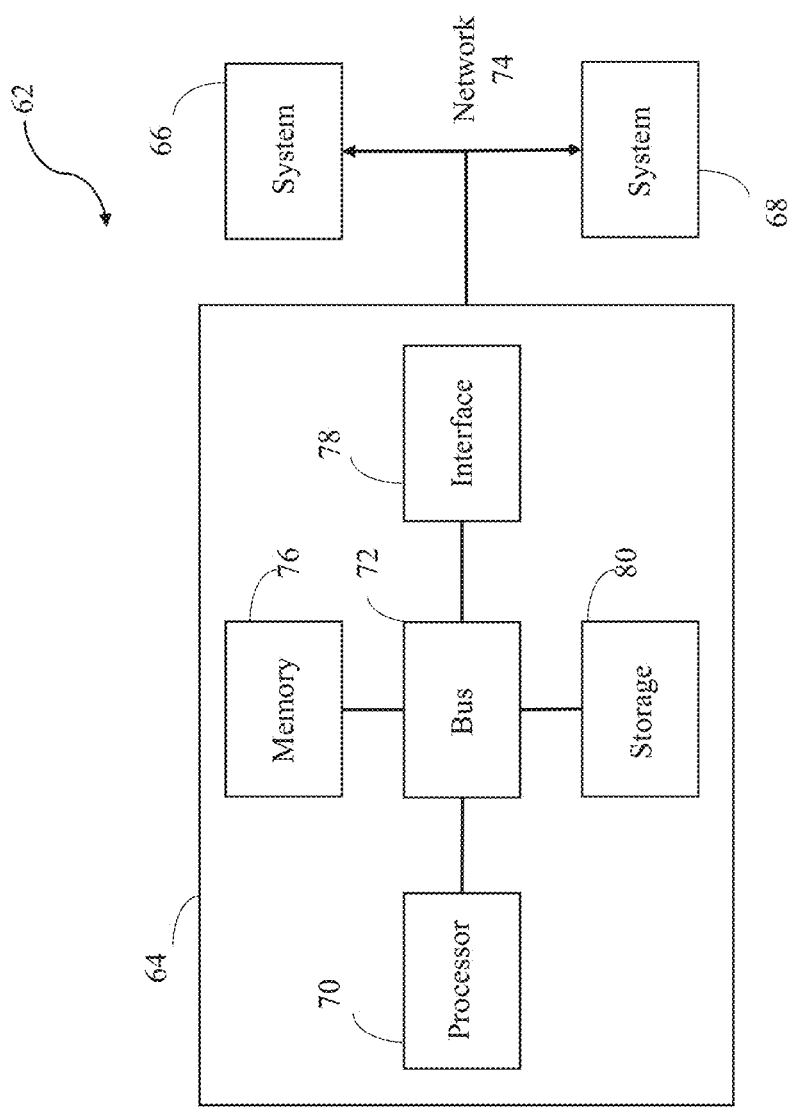
FIG. 12 is a functional block diagram of a computer system according to at least one embodiment.

FIG. 12 is a block diagram of a distributed computer system 62, in which various aspects and functions discussed above may be practiced. The distributed computer system 62 may include one or more computer systems. For example, as illustrated, the distributed computer system 62 includes three computer systems 64, 66 and 68. As shown, the computer systems 64, 66 and 68 are interconnected by, and may exchange data through, a communication network 74. The network 74 may include any communication network through which computer systems may exchange data. To exchange data via the network 74, the computer systems 64, 66, and 68 and the network 74 may use various methods, protocols and standards including, among others, token ring, Ethernet, Wireless Ethernet, Bluetooth, radio signaling, infra-red signaling, TCP/IP, UDP, HTTP, FTP, SNMP, SMS, MMS, SS7, JSON, XML, REST, SOAP, CORBA IIOP, RMI, DCOM, Cellular Phone Services, and Web Services.

In some examples, the computer system 64 is a user's smartphone configured to receive vibration data from the tile device 30. In other examples, the computer system 64 is the computing environment 28.

According to some embodiments, the functions and operations discussed for acquiring and/or processing vibration sensor data can be executed on computer systems 64, 66 and 68 individually and/or in combination. For example, the computer systems 64, 66, and 68 support, for example, participation in a collaborative network. In one alternative, a single computer system (e.g., 64) can both acquire and process the vibration data. The computer systems 64, 66 and 68 may include personal computing devices such as cellular telephones, smartphones, tablets, "fablets," wearable devices such as smart watches, etc., and may also include desktop computers, laptop computers, etc.

Various aspects and functions in accord with embodiments discussed herein may be implemented as specialized hardware or software executing in one or more computer systems including the computer system 64 shown in FIG. 12. In one embodiment, computer system 64 is a personal computing device specially configured to execute the processes and/or operations discussed above. As depicted, the computer system 64 includes at least one processor 70 (e.g., a single core or a multi-core processor), a memory 76, a bus 72, input/output interfaces 78 and storage 80. The processor 70, which may include one or more microprocessors or other types of controllers, can perform a series of instructions that manipulate data. As shown, the processor 70 is connected to other system components, including a memory 68, by an interconnection element (e.g., the bus 72). In at least one example, the processor 70 corresponds to the controller 16.

The memory 76 and/or storage 80 may be used for storing programs and data during operation of the computer system 64. For example, the memory 76 may be a relatively high performance, volatile, random access memory such as a dynamic random-access memory (DRAM) or static memory (SRAM). In addition, the memory 76 may include any device for storing data, such as a disk drive or other non-volatile storage device, such as flash memory, solid state, or phase-change memory (PCM). In further embodiments, the functions and operations discussed with respect to acquiring and processing vibration data can be embodied in an application that is executed on the computer system 64 from the memory 76 and/or the storage 80. For example, the application can be made available through an "app store" for download and/or purchase. Once installed or made available for execution, computer system 64 can be specially configured to execute acquiring and processing vibration data.

Computer system 64 also includes one or more interfaces 78 such as input devices, output devices and combination input/output devices. The interfaces 78 may receive input, provide output, or both. The storage 80 may include a computer-readable and computer-writeable nonvolatile storage medium in which instructions are stored that define a program to be executed by the processor. The storage 80 also may include information that is recorded, on or in, the medium, and this information may be processed by the application. A medium that can be used with various embodiments may include, for example, optical disk, magnetic disk or flash memory, SSD, NVMe, among others. Further, aspects and embodiments are not to a particular memory system or storage system.

In some embodiments, the computer system 64 may include an operating system that manages at least a portion of the hardware components (e.g., input/output devices, touch screens, cameras, etc.) included in computer system 64. One or more processors or controllers, such as processor 70, may execute an operating system which may be, among others, a Windows-based operating system (e.g., Windows NT, ME, XP, Vista, 7, 8, 10, or RT) available from the Microsoft Corporation, an operating system available from Apple Computer (e.g., iOS or MAC OS, including System X), one of many Linux-based operating system distributions (for example, the Enterprise Linux operating system available from Red Hat Inc.), a Solaris operating system available from Sun Microsystems, or a UNIX operating systems available from various sources. Many other operating systems may be used, including operating systems designed for personal computing devices (e.g., iOS, Android, etc.) and embodiments are not limited to any particular operating system.

The processor 70 and operating system together define a computing platform on which applications (e.g., "apps" available from an "app store") may be executed. Additionally, various functions for acquiring and processing vibration data may be implemented in a non-programmed environment (for example, documents created in HTML, XML or other format that, when viewed in a window of a browser program, render aspects of a graphical-user interface or perform other functions). Further, various embodiments in accord with aspects of the present invention may be implemented as programmed or non-programmed components, or any combination thereof. Various embodiments may be implemented in part as MATLAB functions, scripts, and/or batch jobs. Thus, the invention is not limited to a specific programming language and any suitable programming language could also be used.

Although the computer system 64 is shown by way of example as one type of computer system upon which various functions for acquiring and processing vibration data may be practiced, aspects and embodiments are not limited to being implemented on the computer system, shown in FIG. 12. Various aspects and functions may be practiced on one or more computers or similar devices having different architectures or components than that shown in FIG. 12.

Embodiments herein provide solutions for efficiently obtaining and processing vibration data from a multitude of different objects, devices and machines to assist a user in gaining useful information that can be accessed from any location. Though examples of bathroom appliances, garage doors, trashcans, and gym equipment are provided, the vibration tile devices, systems, and methods provided herein are not limited to such examples. Benefits of the vibration tile device 10, 30 include its wide application and customization, providing a user or group of users with a simple and effective way to wirelessly-enable any device that can exhibit a vibration signature.

Having thus described several aspects of at least one embodiment of this disclosure, it is to be appreciated various alterations, modifications, and improvements will readily occur to those skilled in the art. Such alterations, modifications, and improvements are intended to be part of this disclosure and are intended to be within the spirit and scope of the disclosure. Accordingly, the foregoing description and drawings are by way of example only.

What is claimed is:

1. A vibration tile device comprising:
a housing;
a power unit supported by the housing, the power unit being configured to supply power to the vibration tile device;
a vibration sensor supported by the housing, the vibration sensor being configured to acquire vibration data from a surface;
a wireless communication module supported by the housing, the wireless communication module being configured to wirelessly transmit the vibration data to at least one gateway device; and
a controller coupled to the power unit, the vibration sensor, and the wireless communication module, the controller being supported by the housing and configured to
operate the vibration sensor to acquire the vibration data from the surface, and
wirelessly transmit the vibration data to at least one gateway device without storing the vibration data within the vibration tile device.

2. The vibration tile device of claim 1 wherein the housing includes a side having a machine-readable identifier configured to be scanned by a user to direct the user to a mobile application or website that utilizes the acquired vibration data.

3. The vibration tile device of claim 2 wherein the side having the machine-readable identifier is on a side of the vibration tile device opposite to the surface, and wherein the machine-readable identifier is one of a bar code, a QR code, and an NFC tag that uniquely identifies the vibration tile device.

4. The vibration tile device of claim 1 wherein the housing includes a side having one of an adhesive or a magnet configured to adhere the vibration tile device to the surface to acquire the vibration data.

5. A vibration tile system comprising:
at least one vibration tile device comprising
a vibration sensor configured to acquire vibration data from a surface,
a controller configured to operate the vibration sensor to acquire the vibration data from the surface, and
a wireless communication module configured to wirelessly transmit the vibration data;
at least one gateway device configured to receive the wirelessly transmitted vibration data from the at least one vibration tile device; and
at least one processor configured to receive the vibration data from the at least one gateway device, process the vibration data, and wirelessly transmit the vibration data to at least one gateway device without storing the vibration data within the vibration tile device.

6. The vibration tile system of claim 5 wherein the at least one processor further is configured to classify the vibration data by extracting one or more vibration signatures from the vibration data and classifying each of the one or more vibration signatures as one of a plurality of events.

7. The vibration tile system of claim 5 wherein the at least one gateway device is configured to transmit the vibration data to a cloud environment.

8. The vibration tile system of claim 7 wherein the at least one vibration tile device further is configured to transmit the vibration data to the cloud environment responsive to a power level of the at least one vibration tile device being higher than a threshold.

9. The vibration tile system of claim 7 wherein the at least one processor further is configured to train a profile of the at least one vibration tile device to interpret the vibration data acquired from the surface as corresponding to one or more of a plurality of events.

10. The vibration tile system of claim 7 wherein the at least one processor further is configured to use a pre-existing profile of one or more of a plurality of events to interpret the vibration data acquired from the surface as corresponding to the one or more of the plurality of events.

11. A vibration tile system comprising:
at least one vibration tile device comprising
　a vibration sensor configured to acquire vibration data from a surface of a piece of exercise equipment,
　a controller configured to operate the vibration sensor to acquire the vibration data from the surface, and
　a wireless communication module configured to wirelessly transmit the vibration data;
at least one gateway device configured to receive the wirelessly transmitted vibration data from the at least one vibration tile device; and
at least one processor configured to receive the vibration data from the at least one gateway device, recognize the vibration data as one of a plurality of predefined workout activities of a user engaging with the piece of exercise equipment, and wirelessly transmit the vibration data to at least one gateway device without storing the vibration data within the vibration tile device.

12. The vibration tile system of claim 11 wherein the plurality of predefined workout activities includes one or more of a duration of the user engaging with the piece of exercise equipment and a number of repetitions of the user engaging with the piece of exercise equipment.

13. The vibration tile system of claim 11 wherein the at least one processor further is configured to extract one or more vibration signatures from the vibration data and classify each of the one or more vibration signatures as one of the plurality of predefined workout activities.

14. The vibration tile system of claim 11 wherein the at least one gateway device is configured to transmit the vibration data to a cloud environment, wherein the vibration data is stored in the cloud environment and associated with an account of the user.

15. The vibration tile system of claim 11 wherein the at least one vibration tile device includes a side having a machine-readable identifier configured to be scanned by the user to direct the user to a mobile application or website that utilizes the acquired vibration data.

16. The vibration tile system of claim 15 wherein responsive to the user scanning the machine-readable identifier, the at least one processor further is configured to associate the user with the vibration data acquired from the surface of the piece of exercise equipment.

17. The vibration tile system of claim 11 wherein the at least one processor further is configured to train a profile of the at least one vibration tile device to recognize the plurality of predefined workout activities from the at least one piece of exercise equipment.

18. The vibration tile system of claim 11 wherein the at least one processor further is configured to use a pre-existing profile of the at least one piece of exercise equipment for the at least one vibration tile device, wherein the pre-existing profile associates one or more of the plurality of predefined workout activities with corresponding vibration signatures.

19. The vibration tile system of claim 11 wherein the at least one processor further is configured to:
　extract a dominant frequency from the vibration data; and
　classify the vibration data based on the dominant frequency.

* * * * *